US012594647B2

(12) United States Patent
Kang et al.

(10) Patent No.: US 12,594,647 B2
(45) Date of Patent: Apr. 7, 2026

(54) SANDING AUTOMATION SYSTEM AND METHOD

(71) Applicants: HYUNDAI MOTOR COMPANY, Seoul (KR); KIA CORPORATION, Seoul (KR); KOVITECH CO., LTD., Incheon (KR)

(72) Inventors: Rokjong Kang, Anyang-si (KR); Tong Key Jung, Gwangmyeong-si (KR); Jin Cheol Kim, Incheon (KR); Kang Jae Jo, Incheon (KR)

(73) Assignees: HYUNDAI MOTOR COMPANY, Seoul (KR); KIA CORPORATION, Seoul (KR); KOVITECH CO.,LTD., Incheon (KR)

( * ) Notice: Subject to any disclaimer, the term of this patent is extended or adjusted under 35 U.S.C. 154(b) by 760 days.

(21) Appl. No.: 17/989,287

(22) Filed: Nov. 17, 2022

(65) Prior Publication Data

US 2023/0191557 A1     Jun. 22, 2023

(30) Foreign Application Priority Data

Dec. 17, 2021    (KR) ........................ 10-2021-0181881

(51) Int. Cl.
*B24B 49/12*     (2006.01)
*B24B 9/00*     (2006.01)
(Continued)

(52) U.S. Cl.
CPC ................ *B24B 49/12* (2013.01); *B24B 9/00* (2013.01); *B24B 55/06* (2013.01); *B25J 9/1679* (2013.01); *B25J 9/1697* (2013.01); *B25J 11/0065* (2013.01)

(58) Field of Classification Search
CPC ....... B24B 19/26; B24B 19/265; B24B 49/12; B24B 27/0038; B24B 27/04;
(Continued)

(56) References Cited

U.S. PATENT DOCUMENTS 5,394,654 A * 3/1995 Shimbara ................ B24B 27/04
451/6
5,477,268 A * 12/1995 Shimbara ........... G05B 19/4182
348/125
(Continued)

FOREIGN PATENT DOCUMENTS

JP     H07-156055 A     6/1995
JP     2016-078150 A     5/2016
(Continued)

*Primary Examiner* — Joel D Crandall
(74) *Attorney, Agent, or Firm* — MCDONNELL BOEHNEN HULBERT & BERGHOFF LLP

(57)     ABSTRACT

A sanding automation system for removing a surface defect of an exterior component includes a first robot for generating an inspection mark of a certain pattern on an exterior component with uniform pressure through an inspection mark tool to secure visibility of a surface defect, a vision system for analyzing an image of the exterior component photographed through at least one vision sensor and recognizing a surface defect marking position and a surface defect depth level displayed on the exterior component on which the inspection mark is generated, and a second robot for removing the surface defect by sequentially moving a sanding tool to at least one of the surface defect marking positions and performing a sanding operation with the set amount of sanding according to a corresponding surface defect depth level.

20 Claims, 11 Drawing Sheets

(51) Int. Cl.
  B24B 55/06 (2006.01)
  B25J 9/16 (2006.01)
  B25J 11/00 (2006.01)
(58) Field of Classification Search
  CPC ... B24B 27/0023; B24B 51/00; B24B 21/008;
    B05D 5/005; B25J 11/0065; B25J 11/005;
    B25J 9/1697; B25J 19/021; B25J 19/023;
    G01N 21/88; G01N 21/8806; G01N
    21/8851; G06T 19/00
  See application file for complete search history.

(56) References Cited

U.S. PATENT DOCUMENTS

| | | | | |
|---|---|---|---|---|
| 5,716,262 | A * | 2/1998 | Kiba | B24B 27/04 |
| | | | | 451/103 |
| 5,844,801 | A * | 12/1998 | Kodama | B62D 65/005 |
| | | | | 700/110 |
| 6,013,308 | A * | 1/2000 | Saito | B24B 19/26 |
| | | | | 451/6 |
| 6,320,654 | B1 * | 11/2001 | Alders | G01N 21/8806 |
| | | | | 356/237.2 |
| 6,398,870 | B1 * | 6/2002 | Kaya | G01N 21/8851 |
| | | | | 118/712 |
| 6,562,139 | B2 * | 5/2003 | Morton | B24B 27/0038 |
| | | | | 118/695 |
| 6,714,831 | B2 * | 3/2004 | Matthews | G01N 21/8806 |
| | | | | 700/110 |
| 7,248,366 | B2 * | 7/2007 | Uesugi | B21C 51/005 |
| | | | | 356/431 |
| 10,192,367 | B2 | 1/2019 | Ko et al. | |
| 10,488,187 | B2 * | 11/2019 | Koketsu | G01B 11/30 |

FOREIGN PATENT DOCUMENTS

| | | |
|---|---|---|
| KR | 2002-0055812 A | 7/2002 |
| KR | 2013-0005676 A | 1/2013 |
| KR | 2014-0084665 A | 7/2014 |
| KR | 2015-0002968 A | 1/2015 |
| KR | 10-1610148 B1 | 4/2016 |
| KR | 10-1855778 B1 | 5/2018 |
| KR | 2019-0076594 A | 7/2019 |
| KR | 2020-0064474 A | 6/2020 |
| WO | 2021/085106 A1 | 5/2021 |

* cited by examiner

Vehicle body image (2D)

Cell area (assign cell number)

210

250mm

Convex portion distortion occurs in 2D image 3D shape (x1,y1)  (x2,y2)  (x3,y3)

(x4,y4)

Cell1    Cell2

(x1',y1')  (x2',y2') (x3',y3') (x4',y4')

2D image

Actual defect    Defect in image

Correct

Distortion occurs

| | Actual defect | Defect in image | Note |
|---|---|---|---|
| Coordinates | X3 | X3' | Non-match |
| Cell number | Cell 1 | Cell 1 | Match |

Recognize marking position in present invention

SANDING AUTOMATION SYSTEM AND METHOD

CROSS REFERENCE TO RELATED APPLICATIONS

This application claims priority to and the benefit of Korean Patent Application No. 10-2021-0181881 filed in the Korean Intellectual Property Office on Dec. 17, 2021, the entire contents of which are incorporated herein by reference.

BACKGROUND

(a) Field

The present disclosure relates to a sanding automation system and method, and more particularly, to a sanding automation system and method for removing surface defect of a product in an automobile factory.

(b) Description of the Related Art

In general, the main qualities required for a vehicle body include rigidity, dimensions, appearance, and the like.

Metal materials are plastically processed with molds to produce vehicle body components, and in this process, surface defects that affect the appearance quality, such as scratches, bending, irregularities, dents, and stab may occur in the vehicle body. Since these surface defects are not covered even by painting, a sanding operation of recognizing an area of the surface defect through an inspection in the unit of the vehicle body component and performing a sanding on the surface of the area is performed.

On the other hand, since most of the surface defect inspection and sanding operation of the vehicle body is done manually by skilled operators and quality deviations occur depending on the skill level, various automation methods have been proposed to reduce the quality deviation.

For example, in the related art, methods of detecting a defective part formed on a vehicle body through a camera-based image processing technique have been proposed. However, since the main surface defects that actually occur in the vehicle body are "fine bending" on the non-flat surface due to various reasons, such as indentations/dents, pressed mark, and irregularities, there is a limit to detection with image processing techniques, so it is not possible to apply the camera-based image processing technique to the field.

In addition, although sanding automation using a robot is considered, secondary defects, such as contact and interference with equipment, may occur during the sanding process due to the complex shape of the vehicle body, thereby making automation difficult.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to provide a sanding automation system and method, which automatically generate inspection marks on a vehicle body through a robot to secure visibility for surface defect detection, recognizes a surface defect marking position marked on the vehicle body through an image analysis, and automatically controls a sanding operation for the surface defect marking position through the robot.

An exemplary embodiment of the present disclosure provides a sanding automation system for removing a surface defect of an exterior component, the sanding automation system including a first robot for generating an inspection mark of a certain pattern on an exterior component with uniform pressure through an inspection mark tool to secure visibility of a surface defect, a vision system for analyzing an image of the exterior component photographed through at least one vision sensor and recognizing a surface defect marking position and a surface defect depth level displayed on the exterior component on which the inspection mark is generated, and a second robot for removing the surface defect by sequentially moving a sanding tool to at least one of the surface defect marking positions and performing a sanding operation with the set amount of sanding according to a corresponding surface defect depth level.

The first robot and the second robot perform an inspection mark generation operation and a sanding operation by applying uniform pressure to a surface of the vehicle body corresponding to the exterior component through pressure equalization control modules installed in the inspection mark tool and the sanding tool, respectively.

Further, when a measured pressure is larger or smaller than a set pressure, the pressure equalization control module may decrease or increase the measured pressure by a deviation based on the set pressure to control so that uniform pressure is applied to the vehicle body.

Further, the inspection mark tool may include a mount bracket mounted on an end effector of the first robot, a sandpaper module for generating fine inspection marks while moving on the vehicle body in a state of being in contact with the vehicle body corresponding to the exterior component with uniform pressure; an inspection mark generation module for supporting the sandpaper module attached to a lower portion thereof so as not to rotate arbitrarily, a pressure equalization control module installed between the mount bracket and the inspection mark generation module to control the inspection mark generation module to apply uniform pressure to the vehicle body, and a dust absorption module for removing dust generated on the vehicle body by generating suction force.

Further, the first robot may include a first controller for controlling an operation for generating the inspection mark, and the first controller may set an inspection mark tool setting condition and an inspection mark pattern teaching condition according to a material and a shape based on a vehicle body ID for each region of the vehicle body corresponding to the exterior component.

Further, the first controller may set the inspection mark tool setting condition including a sandpaper standard, a face-contact angle of a sandpaper to the vehicle body, pressure, and movement speed according to the material of the vehicle body.

Further, the first controller may set the inspection mark pattern teaching condition to move the sandpaper module of the inspection mark tool fixed without rotation according to the shape of the vehicle body in a constant straight direction in a state where the sandpaper module is in face-contact with the vehicle body.

The first controller may set the inspection mark pattern teaching condition of a plain area formed between character lines to a repeated pattern in a horizontally or vertically constant straight direction along the character line, and set the inspection mark pattern teaching condition of a part corresponding to the character line to a direction in which the corresponding character line is formed.

Further, the vision system may include a vision sensor for photographing a 2D image of the vehicle body corresponding to the exterior component at a designated location, at least one lighting disposed to irradiate uniform light to a front surface of the vehicle body, and a marking analysis controller for analyzing the 2D image photographed by the vision sensor, detecting a surface defect marking position, a surface defect type, and a surface defect size marked on the vehicle body, and transmitting signals for the detected surface defect marking position, surface defect type, and surface defect size to the second robot.

Further, the vision sensor may detect a surface defect including fine bending through vision sensing of the 2D image of the vehicle body on which the inspection mark is generated and virtually mark the detected surface defect on the 2D image of the vehicle body.

When the 2D image is analyzed, the marking analysis controller may delete the background of the image of the vehicle body, and then leave only a product outline and marking based on RGB values and a contrast and inclination value, and process the image of the vehicle body into a black and white image.

The marking analysis controller may build a deep learning model for recognizing a marking shape by learning a characteristic value of the marking by using deep learning, recognize the marking shape in the image of the vehicle body based on the deep learning model, and detect center coordinates $(x, y)$ of the marking shape.

The marking analysis controller may divide an entire area of the image of the vehicle body into a plurality of cell areas and generate a cell matrix map (MAP) in which a unique cell number (cell ID) is assigned to each area, and recognize a cell number (cell ID) of the area where the center coordinates $(x, y)$ are located in the cell matrix map (MAP).

The marking analysis controller may further recognize the surface defect depth level through image analysis in the process of recognizing the marking shape and transmit a signal for the recognized surface defect depth level to the second robot.

Further, the sanding tool may include a mount bracket mounted on an end effector of the second robot, a sandpaper module configured to remove the surface defect while rotating on the vehicle body in a state of being in contact with the vehicle body with uniform pressure, a sanding device to which the sandpaper module is rotatably mounted, which is moved by the second robot to a position of the surface defect of the vehicle body, and performs sanding by applying uniform pressure through the sandpaper module, a pressure equalization control module installed between the mount bracket and the sanding device to control the sanding device to apply uniform pressure to the vehicle body, and a dust absorption module for removing dust generated on the vehicle body by generating suction force.

Further, the second robot may include a second controller for controlling an operation for the sanding operation, and the second controller may store a surface defect sanding condition in consideration of a material and a shape according to the vehicle body ID in the database (DB), and set the surface defect sanding condition based on the surface defect marking position and the surface defect depth level received from the vision system.

Further, the second controller may increase sandpaper roughness and pressing pressure as the surface defect depth level increases, and further increase at least one of a rotation speed (RPM) and the number of times of the sanding of the sanding device and further decrease a movement speed of the second robot.

Further, the second controller may gradually reduce the amount of sanding while expanding a sanded portion with a plurality of levels having a predetermined interval in a circumference around the surface defect marking position to reduce bending deviation and roughness deviation of a boundary between the sanded portion and a non-sanded portion.

Another exemplary embodiment of the present disclosure provides a sanding automation method of a sanding automation system for removing a surface defect of an exterior component, the sanding automation method including a) generating an inspection mark of a certain pattern on an exterior component with uniform pressure and securing visibility of a surface defect by using an inspection mark tool mounted to a first robot, b) analyzing, by a vision system, an image of the exterior component photographed through at least one vision sensor and recognizing at least one of a surface defect marking position, a surface defect type, a surface defect size, and a surface defect depth level displayed on the exterior component on which the inspection mark is generated, and c) performing a sanding operation with the set amount of sanding according to a corresponding surface defect depth level while sequentially moving a sanding tool mounted to a second robot to at least one of the surface defect marking positions to remove the surface defect.

Still another exemplary embodiment of the present disclosure provides a sanding automation system for removing a surface defect of an exterior component, the sanding automation system including: a sanding robot for generating an inspection mark of a certain pattern on a surface of an exterior component with uniform pressure through a non-rotating fixed sanding tool and securing visibility of a surface defect; and a vision system for analyzing an image of the exterior component photographed through at least one vision sensor and recognizing a surface defect marking position and a surface defect depth level displayed on the exterior component on which the inspection mark is generated, in which the sanding robot performs a sanding operation with the amount of sanding set according to a corresponding surface defect depth level while rotating the sanding tool according to a signal received from the vision system and sequentially moving the sanding tool to at least one of the surface defect marking positions to remove the surface defect.

According to the exemplary embodiment of the present disclosure, there is an effect of reducing quality deviation due to human errors and distribution of sanding quality by automating a series of sanding processes for inspecting surface defects of a vehicle body in consideration of the on-site situation of an automobile factory and removing the surface defects to be applied to an actual line.

In addition, there is an effect in that it is possible to minimize human error by securing visibility for the detection of surface defects of the operator through the pre-processing operation of automatically generating inspection marks.

In addition, there is an effect in that it is possible to protect operators from harmful environments, such as aluminum dust, and reduce production costs by automating the surface defect inspection process and the sanding process of the vehicle body.

In addition, there is an effect in that it is easy to obtain data, such as poor data and sanding results, and store and manage the data through a database, and the accumulated data may be used for future improvement of a vehicle body mold and the process.

DETAILED DESCRIPTION

Figure 1:
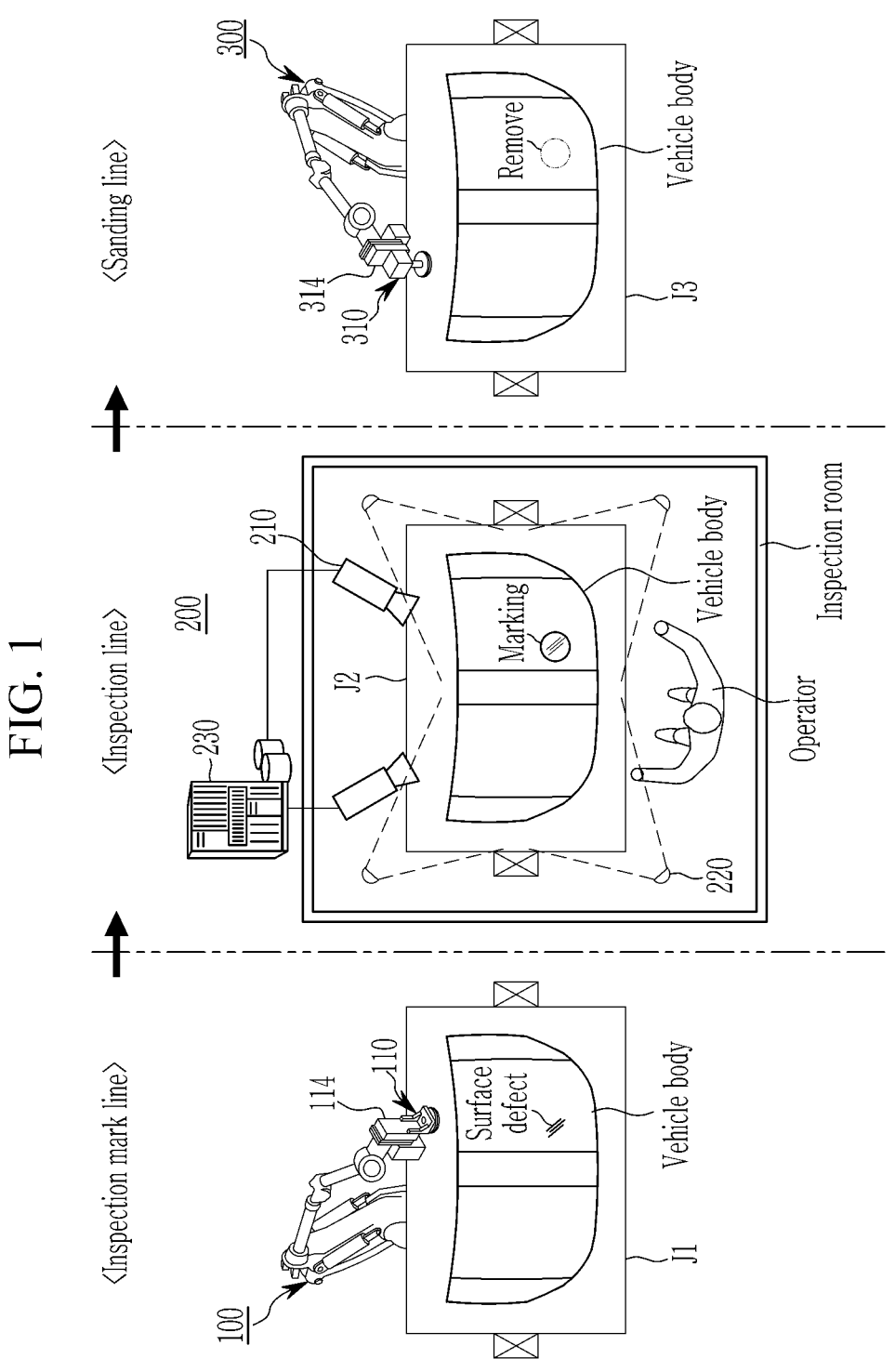
FIG. 1 is a diagram schematically illustrating a configuration of a sanding automation system according to an exemplary embodiment of the present disclosure.

In the following detailed description, only certain exemplary embodiments of the present disclosure have been illustrated and described, simply by way of illustration.

The terms used herein are for the purpose of describing specific exemplary embodiments, and are not intended to limit the present disclosure. As used herein, singular expressions include plural expressions unless they have definitely opposite meanings. The terms "include" and/or "including" specify the presence of the mentioned characteristics, integers, steps, operations, constituent elements, and/or components when used in the present specification, but it will also be understood that this does not exclude the presence or addition of one or more of other characteristics, integers, steps, operations, constituent elements, components, and/or groups thereof. As used herein, the term "and/or" includes any one or all combinations of the associated and listed items.

Throughout the specification, in describing the constructional elements of the present disclosure, the terms of a first, a second, A, B, (a), (b), or the like, can be used, but the constituent elements shall not be limited by the terms. Such a term is only for discriminating the constructional element from another constructional element, and does not limit the essential feature.

It should be understood that when one constituent element is referred to as being "coupled to" or "connected to"

another constituent element, one constituent element can be directly coupled to or connected to the other constituent element, but intervening elements may also be present. In contrast, when one constituent element is "directly coupled to" or "directly connected to" another constituent element, it should be understood that there are no intervening element present.

In addition, it is understood that one or more of the methods below or the aspects thereof may be executed by at least one or more controllers. The term "controller" may refer to a hardware device including a memory and a processor. The memory is configured to store program commands, and the processor is specially programmed so as to execute program commands to perform one or more processes described in more detail below. The controller may control operations of units, modules, components, devices, or similar matters thereof as described herein. Further, it is understood that the following methods may be executed by a device including a controller together with one or more other components as recognized by those skilled in the art.

Further, the controller of the present disclosure may be implemented as a non-transitory computer readable recording medium including program commands executable by a processor. Examples of the computer readable recording medium includes a read only memory (ROM), a random access memory (RAM), a compact disc (CD) ROM, magnetic tapes, floppy discs, flash drives, smart cards, and optical data storage devices, but the computer readable recording medium is not limited thereto. The computer readable recording medium may also be dispersed across the computer network to store and execute program commands by a distributed method, such as a telematics server or a controller arear network (CAN).

Now, a sanding automation system and method according to an exemplary embodiment of the present disclosure will be described in detail with reference to the drawings.

FIG. 1 is a diagram schematically illustrating a configuration of a sanding automation system according to an exemplary embodiment of the present disclosure.

Referring to FIG. 1, the sanding automation system according to the exemplary embodiment of the present disclosure may include a first robot 100 installed in a pre-processing line to generate inspection marks on an exterior component of a product, a vision system 200 installed in an inspection room of an inspection line, and a second robot 300 installed on a sanding line to perform a sanding operation for removing surface defects of the exterior component. Here, the exterior component refers to exterior materials, such as a vehicle body, a case, a housing, a cover, and a main body, for various products produced in factories. In addition, the term "inspection mark" means a fine scratch made for a defect inspection on the surface of the exterior component.

For example, the exterior components (hereinafter, referred to as the "vehicle body" for convenience) constituting the vehicle body of the vehicle are made of a metal material, and are regulated to set positions by jigs J1, J2, and J3 installed in each line. Hereinafter, the sanding automation system according to the exemplary embodiment of the present disclosure will be described as being optimized for a vehicle body made of an aluminum material for convenience of description, but is not limited thereto.

In general, the size, position, and quantity of surface defects cannot be predicted due to manufacturing dispersion of the vehicle body. Therefore, in order to automate the sanding operation for surface defects of the vehicle body through the second robot 300, first, it is necessary to perform an operation of finding a surface defect, determining a position of the surface defect, and then deriving the amount of sanding (the degree of sanding) indicating the amount of sanding to be performed.

As described above, since it is difficult to detect fine bending in which the surface of the vehicle body is not flat with the camera-based image processing technology in the related art, in the inspection process, an operator directly performs the inspection in an inspection room.

To this end, in the pre-processing line, the first robot 100 performs a pre-processing operation of generating inspection marks of a constant straight pattern on the vehicle body with uniform pressure by using an inspection mark tool 110 mounted thereto and securing the visibility of surface defects. As such, it is possible to increase the visibility of the operator and improve the detection efficiency for the detection of surface defects including fine bending through the automated pre-processing operation.

Next, in the inspection line, the operator finds a surface defect on the vehicle body with improved visibility with the inspection marks and marks a circular or polygonal shape (for example, square and triangle) by using a pen. This is to enable the operator to separately mark the fine surface defect position that cannot be found by the image by using the camera in the related art and the vision system 200 to recognize the marked position. Here, it is described that the marking of the fine surface defect position is performed by the operator, but the marking of the fine surface defect position is not limited to being performed only by the operator. For example, a surface defect position may also be automatically marked by using a highly precise image recognition device.

The vision system 200 analyzes a vehicle body image photographed through at least one vision sensor 210 installed in the inspection room, recognizes the surface defect marking position marked on the vehicle body by the operator, and transmits a signal for the recognized surface defect marking position to the second robot 300.

Next, in the sanding line, the second robot 300 performs the sanding operation while sequentially moving a sanding tool 310 mounted thereto to at least one surface defect marking position. The sanding operation is performed with a sanding amount set according to the depth level of the corresponding surface defect to remove the surface defect.

The first robot 100 and the second robot 300 include pressure equalization control modules 114 and 314 installed in the inspection mark tool 110 and the sanding tool 310, respectively. The pressure equalization control modules 114 and 314 are configured to apply uniform pressure regardless of the clearance between various vehicle bodies mounted on the jigs J1 and J3. Accordingly, the inspection mark generation operation and the sanding operation may be consistently performed regardless of product distribution of the vehicle body.

Hereinafter, the configuration of facilities for each line will be described in detail with reference to the drawings.

Figure 2:
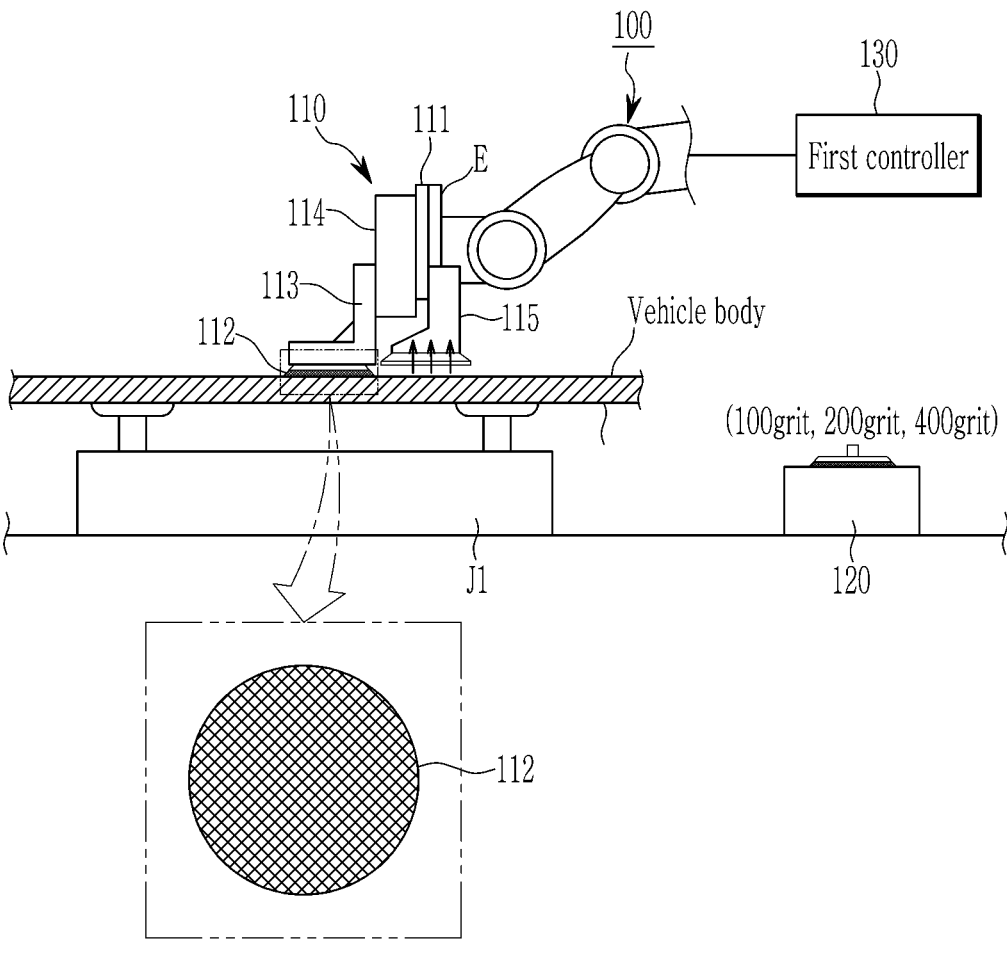
FIG. 2 is a diagram illustrating an inspection mark operation facility of a pre-processing line according to an exemplary embodiment of the present disclosure.

FIG. 2 is a diagram illustrating an inspection mark operation facility of the pre-processing line according to the exemplary embodiment of the present disclosure.

Referring to FIG. 2, the inspection mark operation facility of the pre-processing line is the first jig J1, the first robot 100 equipped with the inspection mark tool 110, an automatic sandpaper changer 120, and a first controller 130.

The first jig J1 regulates the vehicle body seated thereon.

The first robot 100 may be configured as a multi joint manipulator, and the inspection mark tool 110 is mounted at the front end of the first robot 100.

The inspection mark tool 110 includes a mount bracket 111, a sandpaper module 112, an inspection mark generation module 113, a pressure equalization control module 114, and a dust absorption module 115.

The mount bracket 111 is attached or mounted to the inspection mark tool 110, and is mounted to an end-effector E of the first robot 100 through a fastening member to mount the inspection mark tool 110 on the front end of the first robot 100.

The sandpaper module 112 moves on the vehicle body while being in contact with the vehicle body with uniform pressure to generate fine inspection marks. The sandpaper module 112 may be configured with a disc-shaped module that is replaceable when aging. For example, the sandpaper module 112 may be formed of a mesh cloth suitable for creating inspection marks on a soft material of aluminum, or may be formed of sandpaper or oil stone.

The inspection mark generation module 113 supports the sandpaper module 112 attached to the lower portion in an 'L'-shaped cross-sectional shape so as not to rotate arbitrarily.

On the other hand, the clearance between the surface of the vehicle body and the inspection mark generation module 113 may vary depending on the product distribution of the vehicle body when the inspection mark is generated, and accordingly, the quality of inspection marks may be deteriorated due to non-uniform pressure.

In order to solve this problem, the pressure equalization control module 114 is installed between the mount bracket 111 and the inspection mark generation module 113 mounted on the first robot 100 to control the inspection mark generation module 113 to apply uniform pressure to the vehicle body.

That is, since the inspection mark generation module 113 has a structure attached to one surface of the pressure equalization control module 114 and mounted on the mount bracket 111, so that the inspection mark generation module 113 may generate inspection marks of a certain quality by applying uniform pressure to the vehicle body according to the pressure set in the pressure equalization control module 114.

Figure 3A:
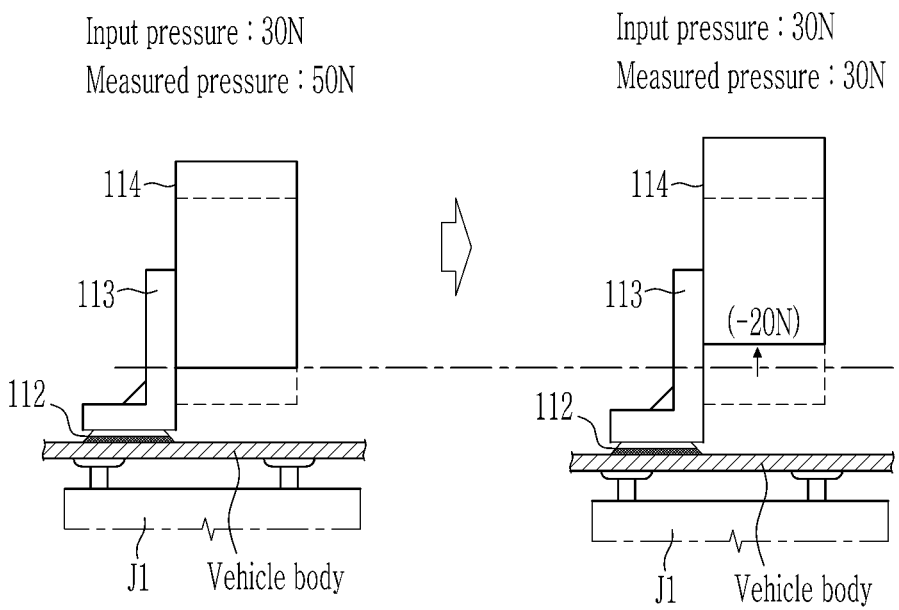
FIGS. 3A and 3B are diagrams illustrating a pressure equalization control method of an inspection mark generation module according to the exemplary embodiment of the present disclosure.
Figure 3B:
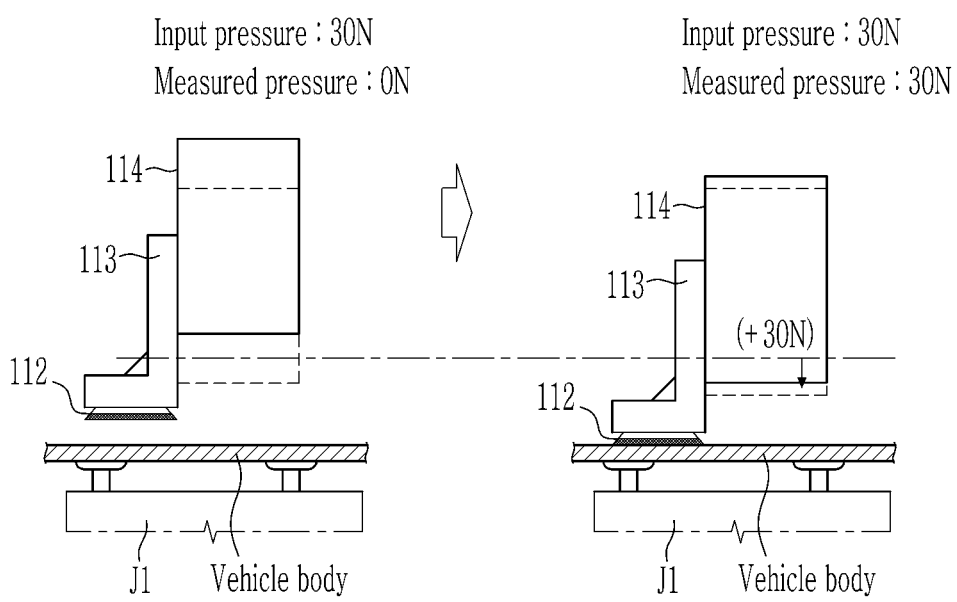

FIGS. 3A-3B are diagrams illustrating the pressure equalization control method of the inspection mark generation module according to the exemplary embodiment of the present disclosure.

The first robot 100 repeats the inspection mark generation operation while moving the inspection mark tool 110 along a movement path and pressure set according to the type ID of the vehicle body.

In this case, when the measured pressure is greater or less than the pressure input as the reference setting, the pressure equalization control module 114 decreases or increases the measured pressure by a deviation based on the input pressure to control so that the uniform pressure is always applied to the vehicle body.

For example, FIG. 3A illustrates a state in which the clearance between the inspection mark generation module 113 and the vehicle body is decreased due to the product dispersion of the vehicle body.

Herein, when the measured pressure (for example, 50N) is larger than the input pressure (for example, 30N) during the inspection mark generation operation of bringing the inspection mark generation module 113 into contact with the vehicle body, the pressure equalization control module 114 reduces a pressure deviation (for example, 20N) based on the input pressure and controls the inspection mark generation module 113 to apply uniform pressure to the vehicle body.

Conversely, FIG. 3B illustrates a state in which the clearance between the inspection mark generation module 113 and the vehicle body is increased due to the product dispersion of the vehicle body.

Herein, when the measured pressure (for example, 0N) is less than the input pressure (for example, 30N) during the inspection mark generation operation of bringing the inspection mark generation module 113 into contact with the vehicle body, the pressure equalization control module 114 increases a pressure deviation (for example, 30N) based on the input pressure and controls the inspection mark generation module 113 to apply uniform pressure to the vehicle body.

The dust absorption module 115 is a suction force generating device mounted on the mount bracket 111 to suck/remove dust generated on the vehicle body during the inspection mark operation.

The automatic sandpaper changer 120 recovers the old sandpaper module 112 from the first robot 100 and supplies the new sandpaper module 112. The automatic sandpaper changer 120 may supply the new sandpaper module 112 having various specifications between 100 grit to 400 grit according to the material of the vehicle body.

The first controller 130 controls the overall operation of the first robot 100 for generating an inspection mark according to a program taught or preset by an engineer, and includes at least one processor and a memory to this end. The memory stores preset programs and data.

The first controller 130 sets an inspection mark tool setting condition and an inspection mark pattern teaching condition of the first robot 100 according to the material and shape based on the ID (hereinafter, referred to as the "vehicle body ID") for each part of the vehicle body.

Figure 4:
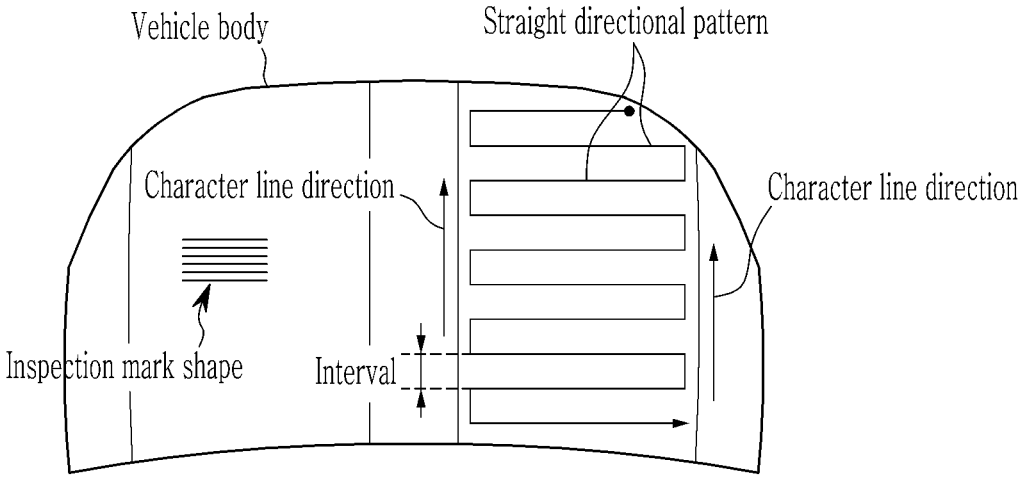
FIG. 4 is a diagram illustrating an inspection mark pattern generating method according to the exemplary embodiment of the present disclosure.

For example, FIG. 4 is a diagram illustrating an inspection mark pattern generating method according to the exemplary embodiment of the present disclosure.

Referring to FIG. 4, the first controller 130 sets an inspection mark tool setting condition including at least one of a sandpaper standard, a face contact angle of the sandpaper to the vehicle body, pressure, and a movement speed of the inspection mark tool according to the material of the vehicle body.

For example, the first controller 130 may set the inspection mark tool setting conditions in which 400 grit of the sandpaper, a pressure of 20 to 30N, and a speed of 400 to 800 mm/s are the optimal values when the vehicle body is made of an aluminum material.

The first controller 130 sets the inspection mark pattern teaching condition of moving the non-rotationally fixed sandpaper module 112 in patterns repeated in a horizontally or vertically uniform straight direction regardless of the left, right, front, and rear direction in the state of being in face contact with the vehicle body according to the shape of the vehicle body.

For example, as illustrated in FIG. 4, the first controller 130 may set the inspection mark pattern teaching condition in which a plain area formed between the character lines on both sides is an "S"-shaped pattern in a constant straight direction along the character line. In this case, for the part corresponding to the character line of the vehicle body, the inspection mark pattern teaching condition is set in the direction in which the character line is formed. In addition, when the inspection mark pattern teaching condition is set, the operation interval of the path along which the sandpaper module 112 moves may be set to 50% or less of the diameter of the sandpaper.

Figure 5:
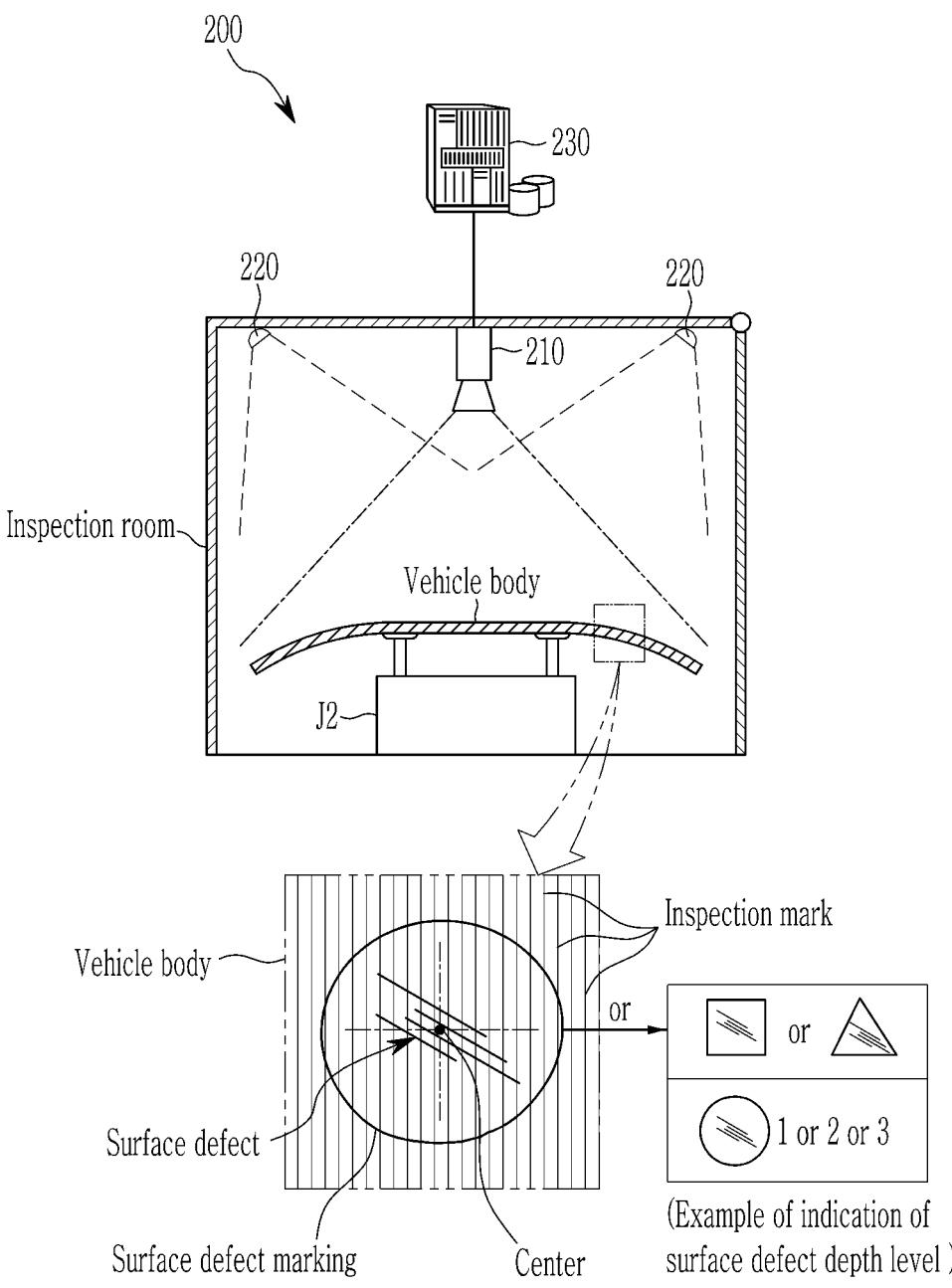
FIG. 5 is a diagram illustrating a configuration of a vision system of an inspection line according to the exemplary embodiment of the present disclosure.

FIG. 5 is a diagram illustrating a configuration of a vision system of an inspection line according to the exemplary embodiment of the present disclosure.

Referring to FIG. 5, the facility installed in the inspection line includes the second jig J2 and the vision system 200 installed in the inspection room.

The inspection room is a box-shaped space equipped with at least one entrance and provides a space for sensing an image of a vehicle body with constant performance without light blur by controlling external light.

The second jig J2 regulates the vehicle body in which the inspection mark is generated in the pre-processing process.

The operator finds surface defects including fine bending on the surface of the vehicle body where the inspection mark is generated and marks the found surface defect in a circular or polygonal shape. The marking is a pre-operation for making the vision system 200 to recognize the surface defect position of the vehicle body.

In this case, the marking may be marked by applying a different polygonal shape according to the surface defect depth level (that is, the degree of fine bending). For example, in the case of the fine bending, the operator may mark the fine bending with a circle of a first level, and from this, as the degree of fine bending increases, the operator may mark the fine bending with a square of a second level, a triangle of a third level, and the like. In addition, the exemplary embodiment of the present disclosure is not limited thereto, and the surface defect depth level may be indicated with one figure and a number (for example, 1, 2, 3) next to the figure.

As described above, other surface defects, such as scratches, may be marked in the same way in addition to the fine bending.

Meanwhile, the vision system 200 includes a vision sensor 210, a lighting 220, and a marking analysis controller 230.

The vision sensor 210 is formed of at least one 2D camera that photographs an image of the vehicle body at a designated location.

For example, the vision sensor 210 may be fixed to a designated position on the ceiling of the inspection room. However, the exemplary embodiment of the present disclosure is not limited thereto, and the vision sensor 210 may be fixed to the periphery of the vehicle body through a stand or mounted on a robot to take pictures at a designated location.

A plurality of lightings 220 is arranged to irradiate uniform light to the surface of the vehicle body inside the inspection room. The position, quantity, illuminance, and the like of the lighting 220 may be optimized by applying differently depending on the material and shape of the vehicle body.

The marking analysis controller 230 is adapted to execute a vision sensing program.

The marking analysis controller 230 analyzes the image photographed from the vision sensor 210, detects information, such as a surface defect marking position, and a type, size, and depth level of the surface defect, marked on the vehicle body, and transmits the detected information to the second robot 300. The type of surface defect may be fine bending, a scratch, an unevenness, a dent and a stab.

Figure 6:
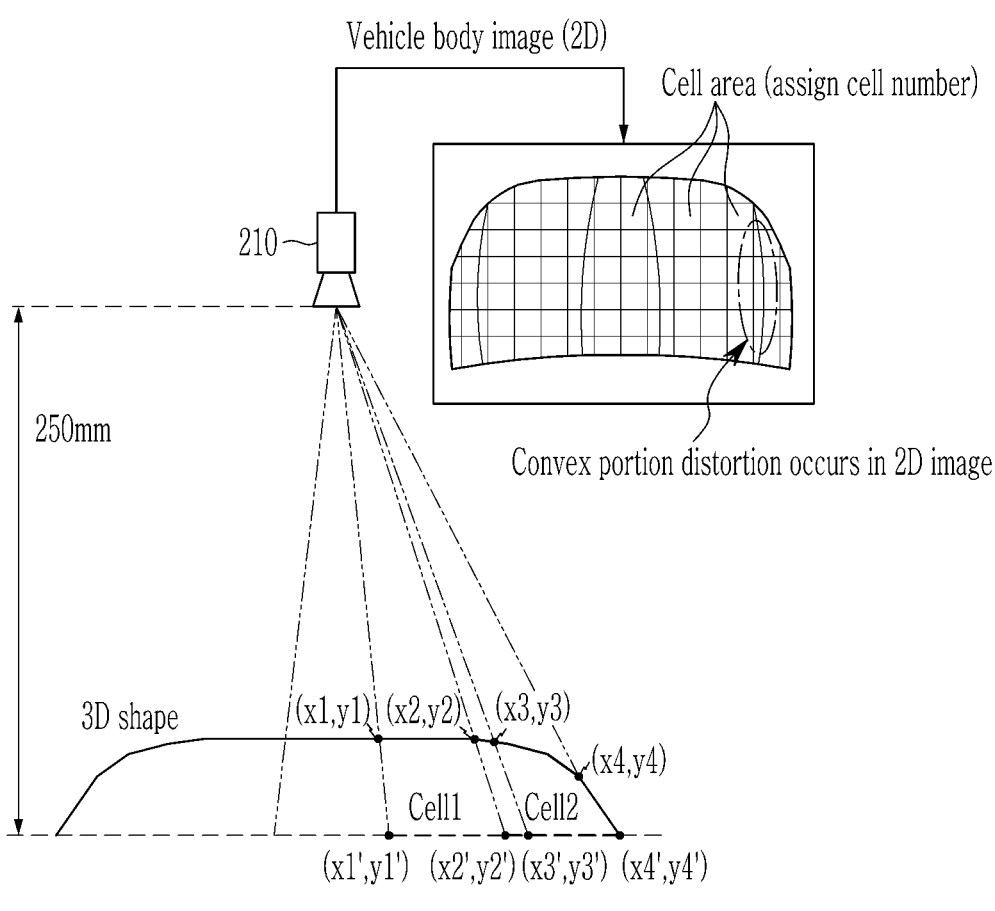
FIG. 6 is a conceptual diagram illustrating a method of detecting a surface defect marking position according to the exemplary embodiment of the present disclosure.
Figure 6:
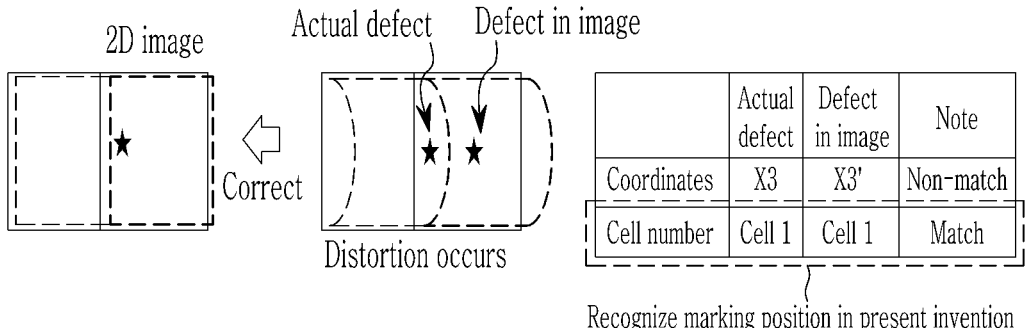

FIG. 6 is a conceptual diagram illustrating a method of detecting a surface defect marking position according to the exemplary embodiment of the present disclosure.

Referring to FIG. 6, according to the characteristic that the vision system 200 analyzes an image photographed by the 2D vision sensor 210 fixed in the upper portion to detect a surface defect marking position, distortion of the 2D image may occur. Therefore, a method of providing information to overcome the image distortion and allow the second robot 300 to sand an accurate surface defect position will be described.

The marking analysis controller 230 deletes the background as a pre-processing process of the image of the vehicle body, and then leaves the product outline and marking based on the RGB value and the contrast and inclination value and deletes the rest to process the image of the vehicle body into a simple black-and-white image.

The marking analysis controller 230 recognizes the marking shape from the entire image processed based on the deep learning model and detects the center coordinates (x, y) of the marking shape. To this end, the marking analysis controller 230 may build a deep learning model for recognizing the marking shape by learning a characteristic value of the marking by using the deep learning in advance.

The marking analysis controller 230 divides the entire area of the image of the vehicle body into several cell areas horizontally and vertically, and generates a cell matrix map MAP in which a unique cell number (cell ID) is assigned to each area. Then, the marking analysis controller 230 recognizes the cell number (cell ID) of the area where the center coordinates (x, y) are located in the cell matrix map MAP. Here, when compared to a general map, the coordinates (x, y) may be compared to latitude and longitude, and the cell number may be compared to the address.

As illustrated in FIG. 6, when the 3D shape of the vehicle body is photographed as a 2D image and the coordinates (x3, y3) are found, there is a problem in that the actual defective position and the defective position on the image are different, and it is difficult to correct the defect through correction. In the exemplary embodiment of the present disclosure, the position of the surface defect may be recognized regardless of the shape of the vehicle body by dividing the entire area of the vehicle body into several cell areas and checking which cell area (number) the surface defect is located in. The marking analysis controller 230 may interpret the size and pattern of the cell area recognized as the surface defect to detect the type of surface defect and the size of the surface defect.

The marking analysis controller 230 may subdivide the division of the cell area according to the size and complexity of the shape of the vehicle body, thereby improving preciseness for the recognition of the surface defect position.

In addition, the marking analysis controller 230 may further recognize the surface defect depth level through the image analysis in the process of recognizing the marking shape and transmit the recognized surface defect depth level to the second robot 300.

Figure 7:
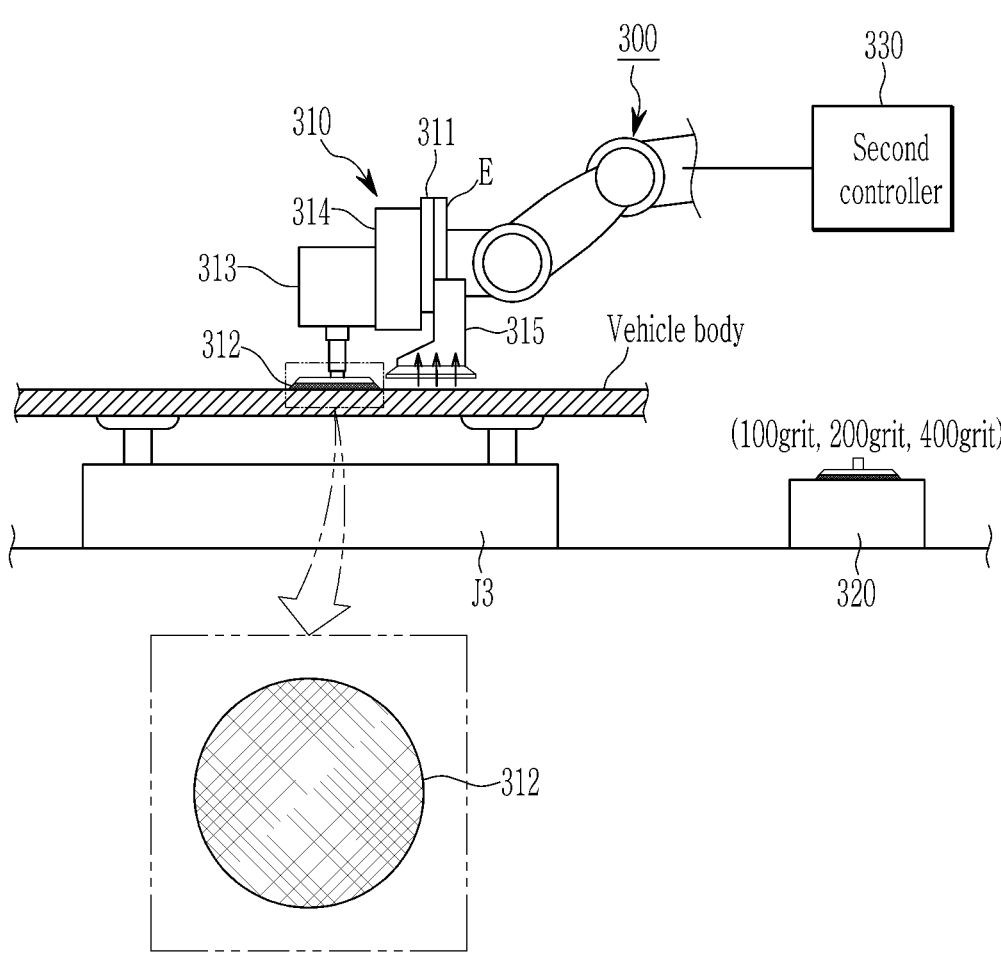
FIG. 7 is a diagram illustrating a sanding operation facility of a sanding line according to the exemplary embodiment of the present disclosure.

In the meantime, FIG. 7 is a diagram illustrating a sanding operation facility of the sanding line according to the exemplary embodiment of the present disclosure.

Referring to FIG. 7, the sanding operation facility of the sanding line includes a third jig J3, a second robot 300 equipped with a sanding tool 310, an automatic sandpaper changer 320, and a second controller 330.

The third jig J3 regulates the vehicle body marked with inspection marks and surface defects.

The second robot 300 may be configured with a multi joint manipulator, and the sanding tool 310 is mounted at the front end of the second robot 300.

The sanding tool 310 includes a mount bracket 311, a sandpaper module 312, a sanding device 313, a pressure equalization control module 314, and a dust absorption module 315.

The mount bracket 311 is attached or mounted to the sanding tool 310, and is mounted to the end effector E of the second robot 300 through a fastening member to mount the sanding tool 310 to the front end of the second robot 300.

The sandpaper module 312 removes the surface defect while rotating on the vehicle body in the state of being in contact with the vehicle body with uniform pressure. The sandpaper module 312 may be configured with a disc-shaped module that is replaceable when aging.

The sanding device 313 is electric using a servo motor, and the sandpaper module 312 may be rotatably mounted on a spindle of the sanding device 313. The sanding device 313 is moved by the second robot 300 to the surface defect position of the vehicle body, and sands the surface defect by applying uniform pressure through the sandpaper module 312.

The pressure equalization control module 314 is installed between the mount bracket 311 and the sanding device 313 mounted on the second robot 300 to control the sanding device 313 to apply uniform pressure to the vehicle body.

That is, since the sanding device 313 has a structure attached to one surface of the pressure equalization control module 314 and mounted on the mount bracket 311, the sanding device 313 may apply uniform pressure to the vehicle body according to the pressure set in the pressure equalization control module 314 to control the amount of sanding of a certain quality.

The descriptions of the control method of the pressure equalization control module 314 and the dust absorption module 315 and the automatic sandpaper changer 320 are similar to the descriptions of the control method of the pressure equalization control module 114, the dust absorption module 115, and the automatic sandpaper changer 120, so that overlapping descriptions will be omitted.

The second controller 330 controls the overall operation of the second robot 300 for the sanding operation according to a taught or preset program, and includes at least one processor and a memory for this purpose. The memory stores preset programs and data.

When the second controller 330 receives the surface defect marking position and the surface defect depth level from the vision system 200, the second controller 330 controls the sanding operation of locating the sanding tool 310 at the surface defect marking position through the second robot 300, adjusting the amount of sanding for each area based on the surface defect depth level, and removing the surface defects.

When the second controller 330 receives information, such as a plurality of surface defect marking positions, a surface defect type, a surface defect size, and a surface defect depth level, from the vision system 200, the second controller 330 may automatically control the sanding operation after sequentially moving the sanding tool 310 to the corresponding positions.

The second controller 330 stores the optimal surface defect sanding condition in consideration of the material and the shape according to the vehicle body ID in the database DB, and sets the optimal surface defect sanding condition based on the received surface defect marking position, surface defect type, surface defect size, and surface defect depth level.

In particular, by adjusting the optimized amount of sanding according to the surface defect depth level, it is possible to solve the problems in the related art, such as failure to completely remove the surface defect according to the sanding with a single setting value or deterioration of operation efficiency and secondary defects due to an unnecessary excessive amount of sanding.

Figure 8:
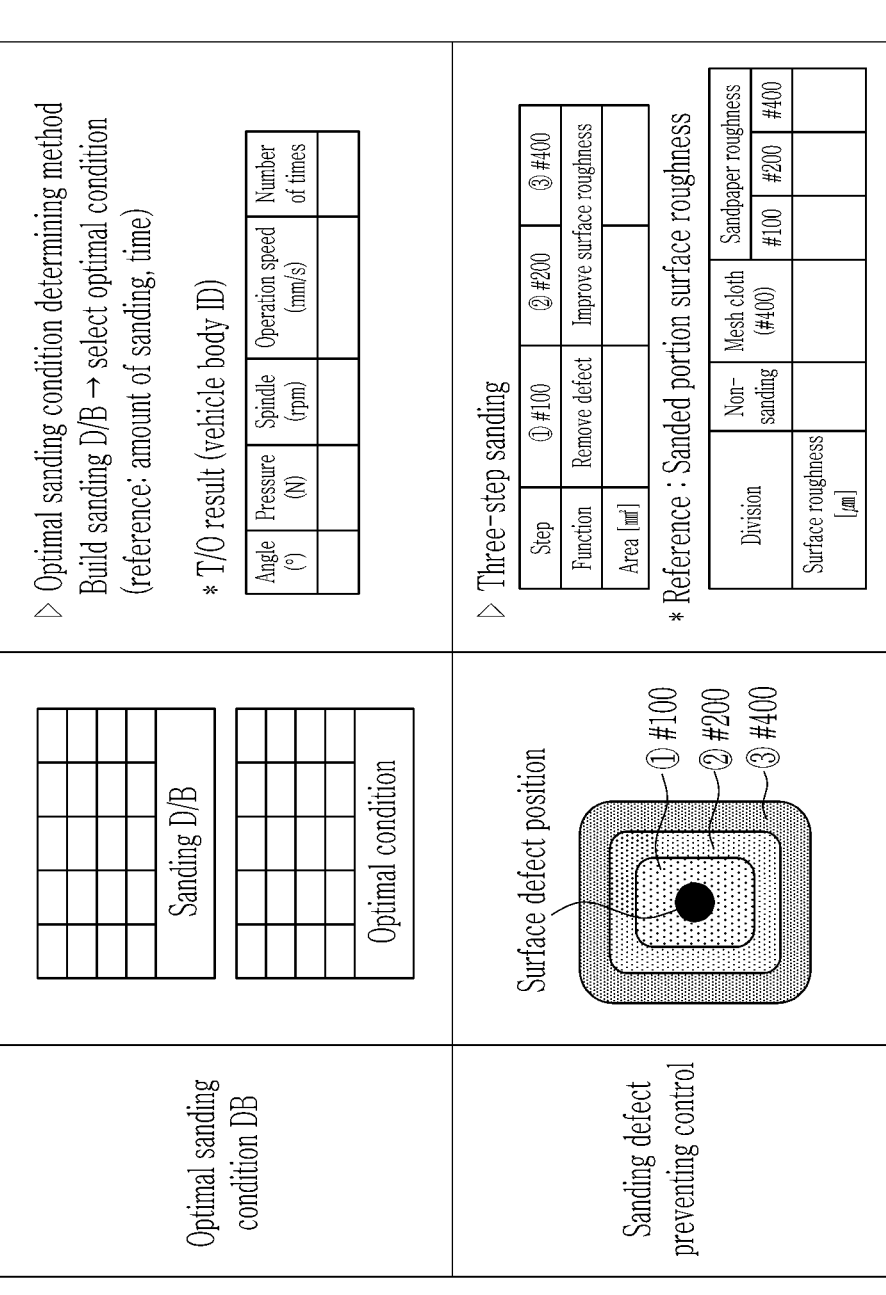
FIG. 8 is a diagram illustrating a method of generating an optimal surface defect sanding condition according to the exemplary embodiment of the present disclosure.

FIG. 8 is a diagram illustrating a method of generating an optimal surface defect sanding condition according to the exemplary embodiment of the present disclosure.

Referring to FIG. 8, in order to determine the amount of sanding according to the surface defect depth level of the vehicle body, the second controller 330 performs sanding while changing main conditions affecting the amount of sanding through a test, measures the amount of sanding and sanding time according to the change in a thickness of the vehicle body as a result of the sanding, and stores the result of the measurement in the DB. Here, the main conditions may include sandpaper roughness, an angle of the sanding device to the surface, pressing pressure, a speed (RPM) of the spindle of the sanding device, a robot movement speed, the number of times of sanding, and the like.

In addition, the second controller 330 may find a sanding condition optimized for the surface defect marking position and the surface defect depth level of the vehicle body ID set in the third jig J3 from the DB and automatically apply the optimized sanding condition.

For example, as the surface defect depth increases from the first level of the fine-scratch degree, the second controller 330 may increase at least one of the sandpaper roughness, the pressing pressure, the speed (RPM) of the spindle of the sanding device, and the number of times of the sanding and decrease a movement speed of the second robot.

In addition, when the bending of a boundary between a sanded portion and a non-sanded portion during the sanding operation is excessive and leaves a sanding mark, a secondary sanding defect problem that is revealed after painting may occur.

In order to prevent the sanding defect problem, the second controller 330 not only sand only the surface defect marking position, but decreases the bending deviation and the roughness deviation of the boundary between the sanded portion and the non-sanded portion under the condition in which the sanded area is widened to multiple levels having a predetermined interval around the circumference about the surface defect marking position and the amount of sanding is gradually decreased. In this case, based on the surface defect marking position, the sanding is repeated while lowering roughness of a first sanded area ① by using 100 grit sandpaper, lowering roughness of a second sanded area ② by using 200 grit sandpaper, and lowering roughness of a third sanded area ③ by using 400 grit sandpaper. And, in the final operation, all sanded areas are sanded by using a sandpaper of 400 grit or more.

Meanwhile, a sanding automation method according to an exemplary embodiment of the present disclosure will be described based on the configuration of the sanding automation system described above.

The first robot 100, the vision system 200, and the second robot 300 of the sanding automation system of the present disclosure may be implemented with one or more processors in which each controller operates according to a set program, and the set program may be programmed to perform each operation of the sanding automation method according to the exemplary embodiment of the present disclosure. Also, the first controller 130, the marking analysis controller 230, and the second controller 330 may also be integrated into one controller.

The sanding automation method will be described in more detail with reference to the drawings below.

Figure 9:
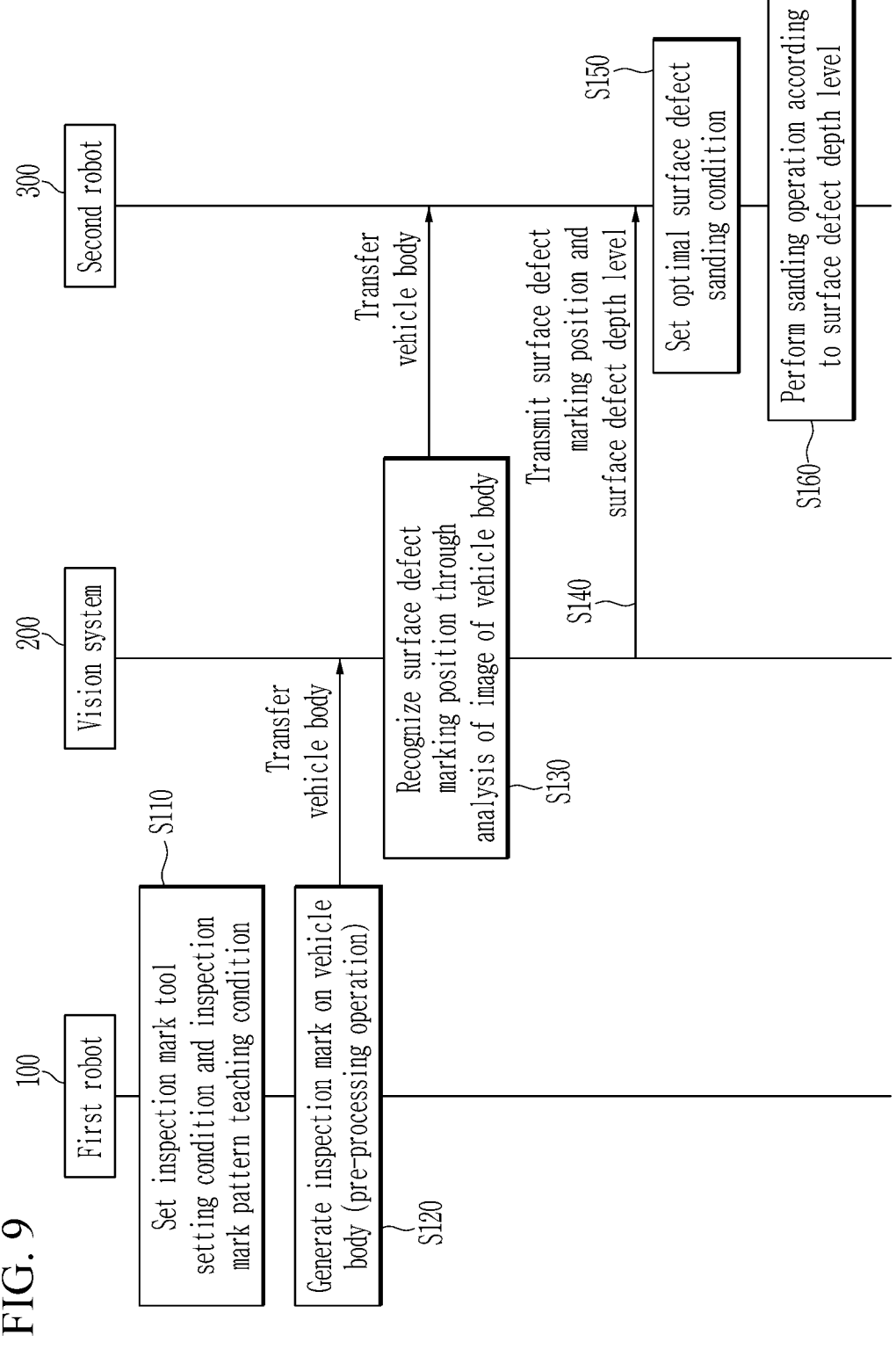
FIG. 9 is a flowchart schematically illustrating a sanding automation method according to an exemplary embodiment of the present disclosure.

FIG. 9 is a flowchart schematically illustrating the sanding automation method according to the exemplary embodiment of the present disclosure.

Referring to FIG. 9, the first robot 100 of the inspection mark line sets an inspection mark tool setting condition and an inspection mark pattern teaching condition according to a material and a shape of a vehicle body loaded on the first jig J1 at S110.

The first robot 100 performs a pre-processing operation to secure visibility of surface defects by generating inspection marks of a constant straight pattern on the vehicle body with uniform pressure using the mounted inspection mark tool 110 at S120.

The vehicle body in which the inspection marks are generated by the preprocessing process is loaded on the second jig J2 of the inspection line. The operator finds surface defects including fine scratches on the surface of the vehicle body where the inspection mark is generated and marks the found surface defect in a circular or polygonal shape. In this case, the marking shape may be displayed differently according to the surface defect depth level.

The vision system 200 analyzes the image of the vehicle body photographed through at least one vision sensor 210 and recognizes the surface defect marking position marked by the operator at S130, and transmits a signal for the recognized surface defect marking position to the second robot 300 at S140. In this case, the vision system 200 may further recognize a surface defect depth level according to the marking shape in the process of recognizing the surface defect marking position and transmit the recognized surface defect depth level to the second robot 300.

The vehicle body of which the inspection is completed is loaded onto the third jig J3 of the sanding line.

The second robot 300 sets an optimal surface defect sanding condition based on the surface defect marking position and the surface defect depth level received from the vision system 200 at S150.

The second robot 300 removes the surface defects by sequentially moving the sanding tool 310 to at least one of the surface defect marking positions and performing the sanding operation with the amount of sanding set according to the corresponding surface defect depth level at S160.

Thereafter, when the second robot 300 completes the removal of all surface defects on the vehicle body, the second robot 300 terminates the sanding operation and waits for the next operation. As described above, according to the exemplary embodiment of the present disclosure, there is an effect of reducing quality deviation due to human errors and distribution of sanding quality by automating a series of sanding processes for inspecting surface defects of a vehicle body in consideration of the on-site situation of an automobile factory and removing the surface defects to be applied to an actual line.

In addition, there is an effect in that it is possible to minimize human error by securing visibility for the detection of surface defects of the operator through the preprocessing operation of automatically generating inspection marks.

In addition, there is an effect in that it is possible to protect operators from harmful environments, such as aluminum dust, and reduce production costs by automating the surface defect inspection process and the sanding process of the vehicle body.

In addition, there is an effect in that it is easy to obtain data, such as poor data and sanding results, and store and manage the data through a database, and the accumulated data may be used for future improvement of a vehicle body mold and the process.

In the foregoing, the exemplary embodiment of the present disclosure has been described, but the present disclosure is not limited only to the exemplary embodiment, and other various modifications are possible.

For example, in the exemplary embodiment of the present disclosure described with reference to FIG. 6, the vision system 200 does not use the center coordinates (x, y) of the marking shape in consideration of the image distortion generated due to the characteristic of using the 2D vision sensor 210, but divides the image into several cell areas to recognize the surface defect marking position. However, the exemplary embodiment of the present disclosure is not limited thereto, and the cell area division may be omitted and the center coordinates (x, y) of the marking shape may be found directly by using the 3D vision sensor.

In addition, in the above-described exemplary embodiment of the present disclosure, it has been described that the first robot 100 and the second robot 300 performs the inspection mark generation operation and the sanding operation by applying uniform pressure regardless of the clearance between various vehicle bodies through the pressure equalization control modules 114 and 314 installed between the inspection mark tool 110 and the sanding tool 310.

However, the exemplary embodiment of the present disclosure is not limited thereto, the inspection mark generation operation and the sanding operation may be controlled with uniform pressure by configuring the first robot 100 and the second robot 300 as a cooperative robot equipped with a force sensor or a torque sensor and replacing the pressure equalization control module.

In addition, in the exemplary embodiment of the present disclosure described with reference to FIG. 1, it has been described that the operator marks the surface defect position of the vehicle body and makes the vision system 200 recognize the surface defect position.

However, the exemplary embodiment of the present disclosure is not limited thereto, and the sanding may be automated by, in a state in which visibility of surface defects is secured by generating inspection marks on the vehicle body, detecting the surface defect including fine bending through the vision sensing of the vision sensor 210 without intervention of the operator and virtually marking the surface defect on a 2D image of the vehicle body including the generated inspection mark. In this case, the marking may be displayed by enhancing the polygonal shape or the surface defect depth level on the 2D image of the vehicle body. Unlike the related art, the exemplary embodiment of the present disclosure is possible through the inspection mark generation operation of securing the visibility of the surface defect by generating the inspection mark on the vehicle body.

Thereafter, the marking analysis controller 230 may analyze the image of the vehicle body marked from the vision sensor 210 and detect information such as the surface defect marking position, the surface defect type, and the size and a depth level of the vehicle body, and transmit the detected information to the second robot 300.

In addition, in the exemplary embodiment of the present disclosure described above, it has been described that the first robot 100 and the second robot 300 are equipped with the inspection mark tool 110 and the sanding tool 310, respectively, to perform the inspection mark generation operation and the sanding operation, respectively.

However, the exemplary embodiment of the present disclosure is not limited thereto, and the inspection mark generation operation and the sanding operation may be performed according to a control method by using the sanding tool mounted on one sanding robot.

Figure 10:
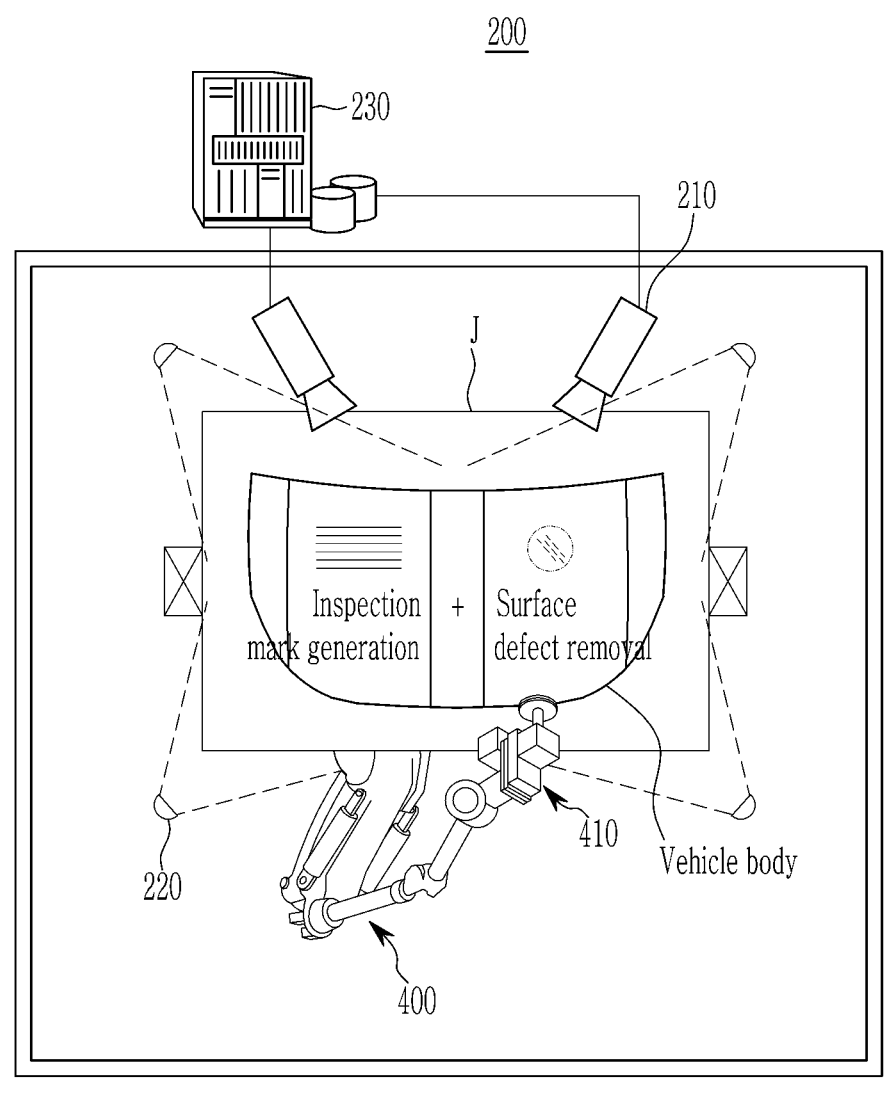
FIG. 10 is a diagram schematically illustrating a configuration of a sanding automation system using one robot according to another exemplary embodiment of the present disclosure.

For example, FIG. 10 is a diagram schematically illustrating a configuration of a sanding automation system using one sanding robot according to another exemplary embodiment of the present disclosure.

Hereinafter, since FIG. 10 is similar to the above-described exemplary embodiment, and only the fact that one sanding robot 400 is included is different, similar descriptions will be omitted and different points will be mainly described.

Referring to FIG. 10, a sanding automation system for removing surface defects of exterior components, such as a vehicle body, according to another embodiment of the present disclosure includes a sanding robot 400 for generating an inspection mark of a certain pattern on a surface of an exterior component with uniform pressure through a non-rotationally fixed sanding tool 410 to secure visibility of a surface defect, and a vision system 200 for analyzing an image of the exterior component photographed through at least one vision sensor to recognize a surface defect marking position and a surface defect depth level marked on the exterior component where the inspection mark is generated, and the sanding robot 400 rotates the sanding tool 410 according to a signal received from the vision system 200, sequentially moves the sanding tool 410 to at least one surface defect marking position, and performs a sanding operation with the set amount of sanding according to the corresponding surface defect depth level to remove the surface defect.

Here, the sanding tool 410 is substantially the same as the configuration of the sanding tool 310 in the above-described embodiment, and operates in an inspection mark generation mode or in a sanding mode according to a control signal received from the vision system 200. In addition, the sanding robot 400 may replace the sandpaper module set according to the mode conversion to any one of the inspection mark generation mode and the sanding mode.

As a result, it is possible to minimize the transfer of exterior components and process equipment, and to integrate inspection mark generation, inspection, and sanding operations in one operation location, thereby reducing process costs and reducing operation space.

The exemplary embodiment of the present disclosure is not implement only through the device and/or method described above, and may be implemented through a program for implementing a function corresponding to the configuration of the exemplary embodiment of the present disclosure, a recording medium in which the program is recorded, and the like, and the implementation may be easily realized by those skilled in the art based on the description of the exemplary embodiment.

Although an exemplary embodiment of the present disclosure has been described in detail, the scope of the present disclosure is not limited by the exemplary embodiment. Various changes and modifications using the basic concept of the present disclosure defined in the accompanying claims by those skilled in the art shall be construed to belong to the scope of the present disclosure.

The invention claimed is:

1. A sanding automation system for removing a surface defect of an exterior component, the sanding automation system comprising:

a first robot including an inspection mark tool, wherein the inspection mark tool is configured to generate an inspection mark of a certain pattern on an exterior component with uniform pressure to secure visibility of a surface defect;

a vision system including at least one vision sensor, wherein the at least one vision sensor is configured to analyze an image of the exterior component photographed, and to recognize a surface defect marking position and a surface defect depth based on an inspection mark displayed on the exterior component; and a second robot including a sanding tool, wherein the sanding tool is configured to remove the surface defect by sequentially moving to at least one of the surface defect marking positions and performing a sanding operation with the set amount of sanding according to a corresponding surface defect depth.

2. The sanding automation system of claim 1, wherein:
the first robot and the second robot perform an inspection mark generation operation through pressure equalization control modules installed in the inspection mark tool, and a sanding operation through the sanding tool, to apply uniform pressure to a surface of the vehicle body corresponding to the exterior component.

3. The sanding automation system of claim 2, wherein:
when a measured pressure is larger or smaller than a set pressure, the pressure equalization control module decreases or increases the measured pressure by a deviation based on the set pressure so uniform pressure is applied to the vehicle body.

4. The sanding automation system of claim 1, wherein:
the inspection mark tool includes:
a mount bracket mounted on an end effector of the first robot;

a sandpaper module configured to generate fine inspection marks while moving on the vehicle body when in contact with the vehicle body corresponding to the exterior component with uniform pressure;

an inspection mark generation module configured to support the sandpaper module and attached to a lower portion of the sandpaper module, the inspection mark generation module being further configured to prevent arbitrary rotation;

a pressure equalization control module positioned between the mount bracket and the inspection mark generation module, the pressure equalization module being configured to control the inspection mark generation module to apply uniform pressure to the vehicle body; and a dust absorption module configured to remove dust generated on the vehicle body by generating a suction force.

5. The sanding automation system of claim 1, wherein:
the first robot includes a first controller for controlling an operation for generating the inspection mark, and
wherein the first controller sets an inspection mark tool setting condition and an inspection mark pattern teaching condition according to a material and a shape based on a vehicle body ID for each region of the vehicle body corresponding to the exterior component.

6. The sanding automation system of claim 5, wherein:
the first controller sets the inspection mark tool setting condition including a sandpaper standard, a face-contact angle of a sandpaper to the vehicle body, pressure, and movement speed according to the material of the vehicle body.

7. The sanding automation system of claim 5, wherein:
the first controller sets the inspection mark pattern teaching condition to move the sandpaper module of the inspection mark tool fixed without rotation according to the shape of the vehicle body in a constant straight direction in a state where the sandpaper module is in face-contact with the vehicle body.

8. The sanding automation system of claim 7, wherein:
the first controller sets the inspection mark pattern teaching condition of a plain area formed between character lines to a repeated pattern in a horizontally or vertically constant straight direction along the character line, and sets the inspection mark pattern teaching condition of a part corresponding to the character line to a direction in which the corresponding character line is formed.

9. The sanding automation system of claim 1, wherein:
the vision system includes:
a vision sensor for photographing a 2D image of the vehicle body corresponding to the exterior component at a designated location;

at least one light disposed to irradiate uniform light to a front surface of the vehicle body; and a marking analysis controller configured to analyze the 2D image photographed by the vision sensor, to detect a surface defect marking position, a surface defect type, and a surface defect size marked on the vehicle body, and to transmit signals for the detected surface defect marking position, surface defect type, and surface defect size to the second robot.

10. The sanding automation system of claim 9, wherein:
the vision sensor detects a surface defect including fine bending through vision sensing of the 2D image of the vehicle body on which the inspection mark is generated and virtually marks the detected surface defect on the 2D image of the vehicle body.

11. The sanding automation system of claim 9, wherein:
when the 2D image is analyzed, the marking analysis controller deletes the background of the image of the vehicle body, and then leaves only a product outline and marking based on RGB values and a contrast and inclination value, and processes the image of the vehicle body into a black and white image.

12. The sanding automation system of claim 9, wherein:
the marking analysis controller builds a deep learning model for recognizing a marking shape by learning a characteristic value of the marking by using deep learning, recognizes the marking shape in the image of the vehicle body based on the deep learning model, and detects center coordinates (x, y) of the marking shape.

13. The sanding automation system of claim 12, wherein:
the marking analysis controller divides an entire area of the image of the vehicle body into a plurality of cell areas and generates a cell matrix map (MAP) in which a unique cell number (cell ID) is assigned to each area, and recognizes a cell number (cell ID) of the area where the center coordinates (x, y) are located in the cell matrix map (MAP).

14. The sanding automation system of claim 12, wherein:
the marking analysis controller further recognizes the surface defect depth level through image analysis in the process of recognizing the marking shape and transmits a signal for the recognized surface defect depth level to the second robot.

15. The sanding automation system of claim 1, wherein:
the sanding tool includes:
a mount bracket mounted on an end effector of the second robot;

a sandpaper module configured to remove the surface defect while rotating on the vehicle body in a state of being in contact with the vehicle body with uniform pressure;

a sanding device to which the sandpaper module is rotatably mounted, which is moved by the second robot to a position of the surface defect of the vehicle body, and performs sanding by applying uniform pressure through the sandpaper module;

a pressure equalization control module installed between the mount bracket and the sanding device to control the sanding device to apply uniform pressure to the vehicle body; and a dust absorption module configured to remove dust generated on the vehicle body by generating a suction force.

16. The sanding automation system of claim 1, wherein:
the second robot includes a second controller for controlling an operation for the sanding operation, and
the second controller stores a surface defect sanding condition in consideration of a material and a shape according to the vehicle body ID in the database (DB), and sets the surface defect sanding condition based on the surface defect marking position and the surface defect depth level received from the vision system.

17. The sanding automation system of claim 16, wherein:
the second controller increases sandpaper roughness and pressing pressure as the surface defect depth level increases, and further increases at least one of a rotation speed (RPM) and the number of times of the sanding of the sanding device and further decreases a movement speed of the second robot.

18. The sanding automation system of claim 16, wherein:
the second controller gradually reduces the amount of sanding while expanding a sanded portion with a plurality of levels having a predetermined interval in a circumference around the surface defect marking position to reduce bending deviation and roughness deviation of a boundary between the sanded portion and a non-sanded portion.

19. A sanding automation method of a sanding automation system for removing a surface defect of an exterior component, the sanding automation method comprising:
a) using an inspection mark tool mounted to a first robot, generating an inspection mark of a certain pattern on an exterior component with uniform pressure, and securing visibility of a surface defect;
b) analyzing, by a vision system, an image of the exterior component photographed through at least one vision sensor and recognizing at least one of a surface defect marking position, a surface defect type, a surface defect size, and a surface defect depth based on the inspection mark on the exterior component; and
c) performing a sanding operation with the set amount of sanding according to a corresponding surface defect depth level while sequentially moving a sanding tool mounted to a second robot to at least one of the surface defect marking positions to remove the surface defect.

20. A sanding automation system for removing a surface defect of an exterior component, the sanding automation system comprising:
a sanding robot configured to generate an inspection mark of a certain pattern on a surface of an exterior component with uniform pressure through a non-rotating fixed sanding tool and securing visibility of a surface defect; and
a vision system including at least one vision sensor, wherein the at least one vision sensor is configured to analyze an image of the exterior component photographed and to recognize a surface defect marking position and a surface defect depth based on an inspection mark displayed on the exterior component;
wherein the sanding robot performs a sanding operation with the amount of sanding set according to a corresponding surface defect depth level while rotating the sanding tool according to a signal received from the vision system and sequentially moving the sanding tool to at least one of the surface defect marking positions to remove the surface defect.

*     *     *     *     *